(12) United States Patent
Takada et al.

(10) Patent No.: US 11,953,373 B1
(45) Date of Patent: Apr. 9, 2024

(54) SENSOR DEVICE AND SENSING METHOD

(71) Applicant: Japan Display Inc., Tokyo (JP)

(72) Inventors: Naoki Takada, Tokyo (JP); Xingle Wang, Tokyo (JP); Chung-Kai Chen, San Jose, CA (US)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/967,898

(22) Filed: Oct. 18, 2022

(51) Int. Cl.
*G01J 1/44* (2006.01)
*G01J 1/46* (2006.01)

(52) U.S. Cl.
CPC . *G01J 1/44* (2013.01); *G01J 1/46* (2013.01); *G01J 2001/446* (2013.01); *G01J 2001/448* (2013.01)

(58) Field of Classification Search
CPC .......... G01J 1/44; G01J 1/46; G01J 2001/446; G01J 2001/448
See application file for complete search history.

(56) References Cited

U.S. PATENT DOCUMENTS

| | | | | |
|---|---|---|---|---|
| 2002/0043610 A1* | 4/2002 | Lee | ...................... | H04N 25/617 348/E3.018 |
| 2006/0027730 A1* | 2/2006 | Bamji | ................... | H04N 25/65 348/E3.018 |
| 2008/0112651 A1* | 5/2008 | Cho | ...................... | H04N 25/533 348/E3.018 |
| 2018/0139396 A1* | 5/2018 | Totsuka | ................. | H04N 25/75 |
| 2018/0376082 A1* | 12/2018 | Liu | ......................... | H04N 25/79 |

FOREIGN PATENT DOCUMENTS

| | | |
|---|---|---|
| JP | 2021-149038 A | 9/2021 |
| JP | 2021-157657 A | 10/2021 |

\* cited by examiner

*Primary Examiner* — Thanh Luu
*Assistant Examiner* — Monica T Taba
(74) *Attorney, Agent, or Firm* — XSENSUS LLP

(57) ABSTRACT

According to one embodiment, a sensor device comprises a sensor configured to output a sense signal, a value the sense signal changing over time based on incident light, a first reset circuit configured to set the value of the sense signal to a reset value when the value of the sense signal exceeds a threshold, a counter configured to count a first number of times of reset by the first reset circuit, and an arithmetic operation circuit configured to calculate an amount of incident light of a certain period based on the value of the sense signal, the reset value, and the first number of times of reset.

7 Claims, 10 Drawing Sheets

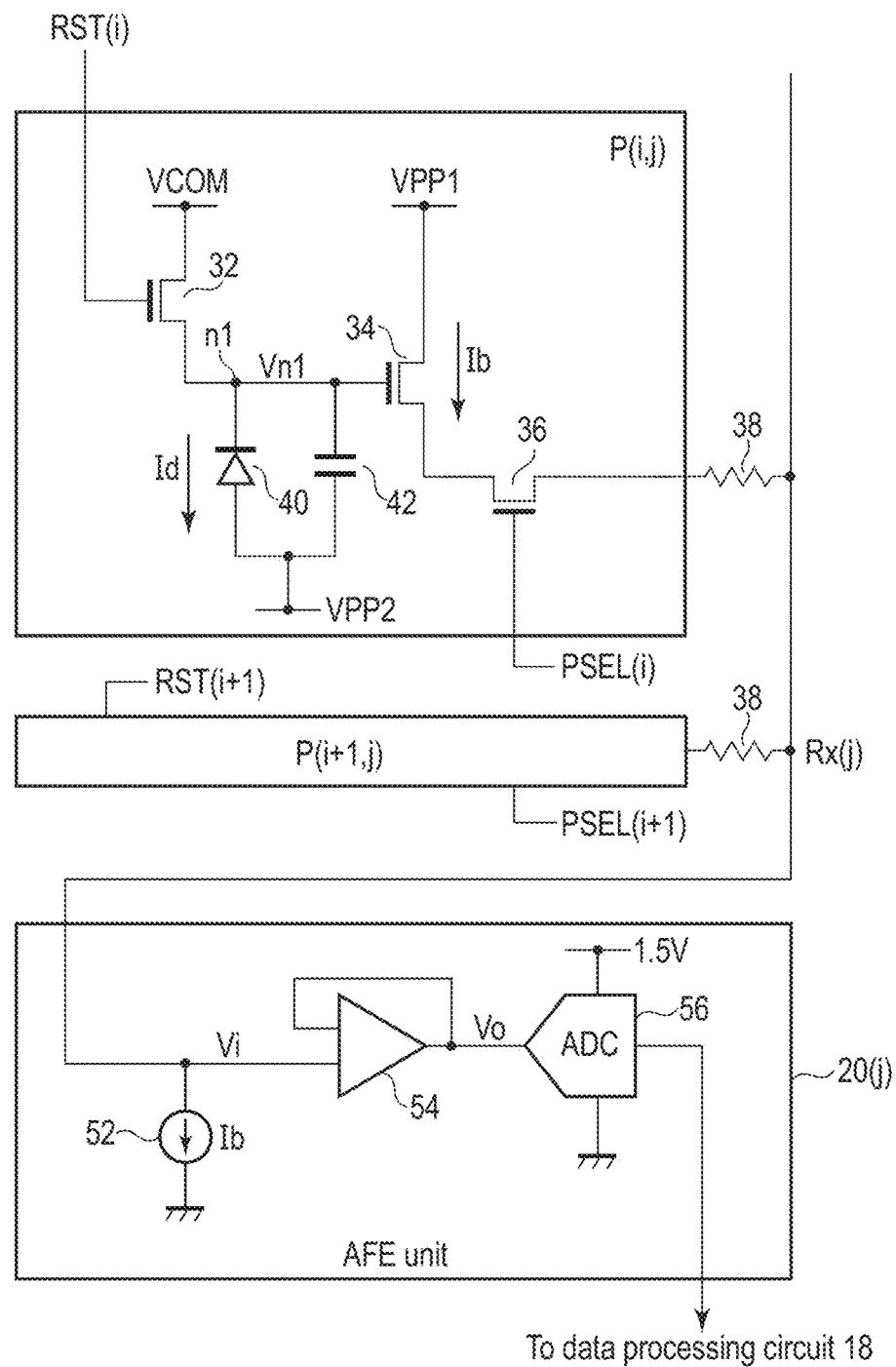
F I G. 3

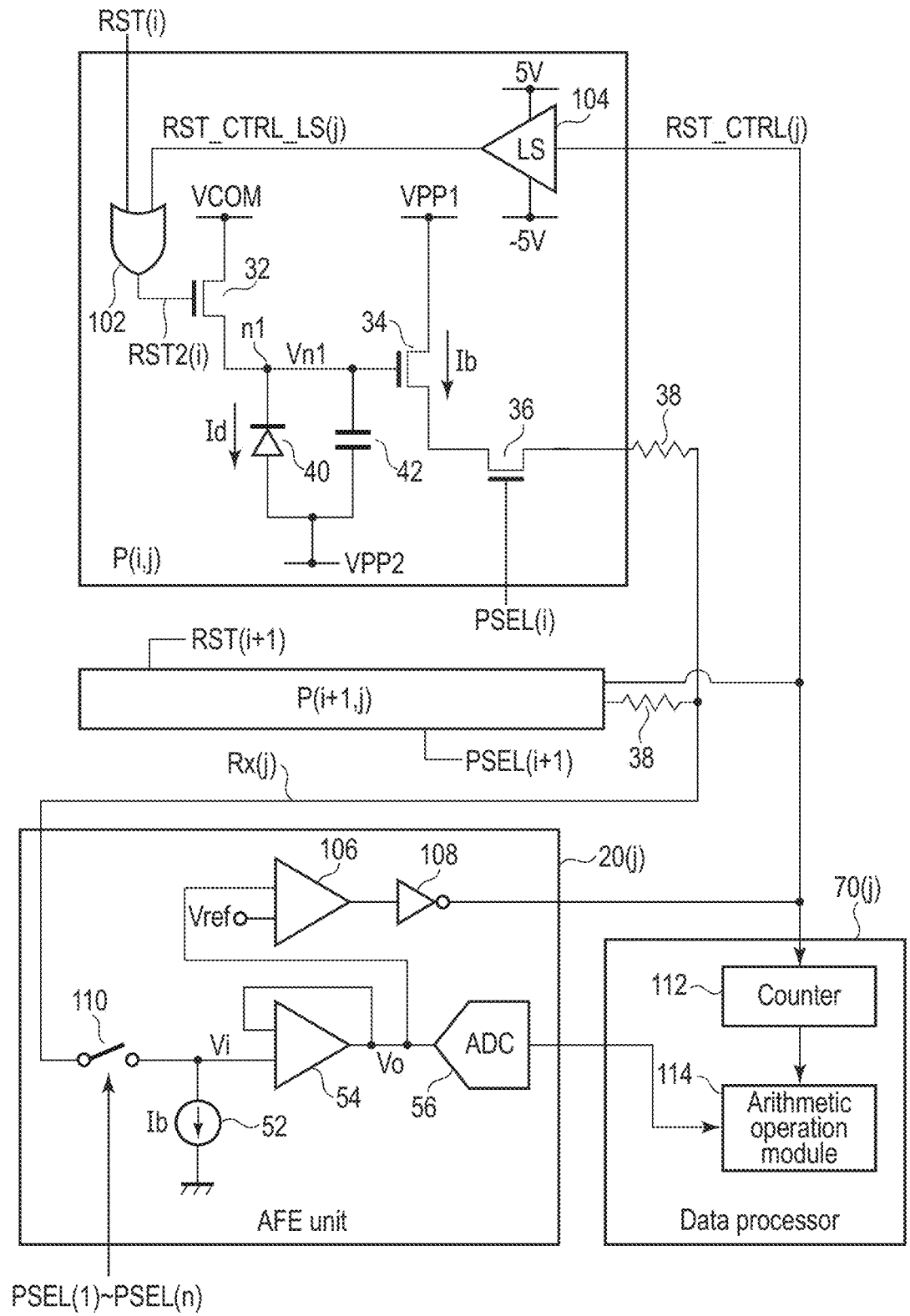
F I G. 8

| Id | nA | 0.5 | 0.5 | 0.5 | 0.5 | 0.5 |
|---|---|---|---|---|---|---|
| T line | ms | 1 | 50 | 1000 | 5000 | 10000 |
| Cs | pF | 10 | 10 | 10 | 10 | 10 |
| ΔVn1 | mV | 50 | 2500 | 50000 | 250000 | 500000 |
| CT | count | 0 | 3 | 62 | 312 | 625 |
| ΔVcomp | mV | 800 | 800 | 800 | 800 | 800 |
| ΔVout total | mV | 50 | 2500 | 50000 | 250000 | 500000 |
| Dynamic range | dB | 55 | 67 | 91 | 105 | 111 |

SENSOR DEVICE AND SENSING METHOD

FIELD

Embodiments described herein relate generally to a sensor device and a sensing method.

BACKGROUND

An example of a sensor device is a sensor device including optical sensors provided in a two-dimensional array. Light is transmitted to an object to be sensed. The optical sensors detect the reflected light or transmitted light of the object. For example, the optical sensors are photodiodes. Switching elements are connected to the optical sensors. By bringing a switching element into conduction, an optical sensor is selected. The optical sensor to be selected is sequentially changed, and thus, the object is scanned by the optical sensors.

The sensitivity of the sensor device depends on the dynamic range of the optical sensors. The dynamic range of the optical sensors corresponds to the ratio between the maximum value and the minimum value of the output of the optical sensors. In the conventional sensor devices, the dynamic range is small.

BRIEF DESCRIPTION OF THE DRAWINGS

FIG. 3 is a diagram for explaining an example of sensor units and AFE units according to the embodiment.

FIG. 8 is a diagram for explaining an example of a configuration for enlarging the dynamic range according to the embodiment.

DETAILED DESCRIPTION

Figure 1:
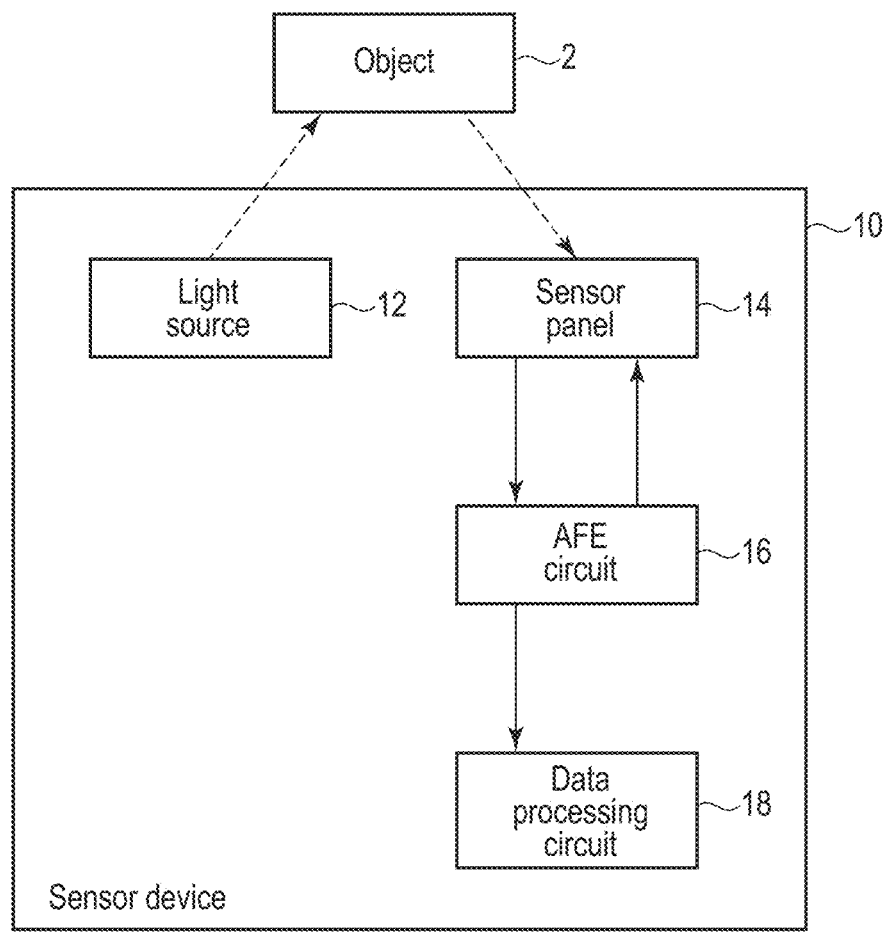
FIG. 1 is a diagram for explaining an example of a sensor device according to an embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a sensor device comprises a sensor configured to output a sense signal, a value the sense signal changing over time based on incident light; a first reset circuit configured to set the value of the sense signal to a reset value when the value of the sense signal exceeds a threshold; a counter configured to count a first number of times of reset by the first reset circuit; and an arithmetic operation circuit configured to calculate an amount of incident light of a certain period based on the value of the sense signal, the reset value, and the first number of times of reset.

FIG. 1 is a diagram for explaining an example of a sensor device 10 according to an embodiment. The sensor device 10 comprises a light source 12, a sensor panel 14, an analog front end (AFE) circuit 16, and a data processing circuit 18.

The light source 12 emits light to an object 2 to be sensed. The reflected light from the object 2 enters the sensor panel 14. The sensor panel 14 comprises optical sensors provided in a two-dimensional array. For example, the optical sensors are photodiodes.

When the object 2 is a finger of a human, the light source 12 may emit visible light to the object 2, and the sensor device 10 may generate a fingerprint image based on the visible light reflected on the object 2.

The type of the sensor device 10 of the embodiment shown in FIG. 1 is a reflective type. The embodiment may be a transmissive type of a sensor device in which the light having passed through the object 2 enters the sensor panel 12. The transmissive type of the sensor device may be configured such that the sensor device comprises the sensor panel 14, the AFE circuit 16, and the data processing circuit 18 and does not comprise the light source 12. The object 2 may be provided between the light source 12 and the sensor device.

In the transmissive type of the sensor device 10, when the object 2 is a hand of a human, the light source 12 may emit near-infrared light to the object 2, and the sensor device 10 may generate a vein image based on the near-infrared light which passed through the object 2.

The AFE circuit 16 is connected to the sensor panel 14. The AFE circuit 16 converts an analog signal from the sensor panel 14 into a digital signal. The AFE circuit 16 supplies the digital signal to the data processing circuit 18. The data processing circuit 18 may not be incorporated into the sensor device 10 and may be incorporated into a server which is connected to the AFE circuit 16 via a network.

Figure 2:
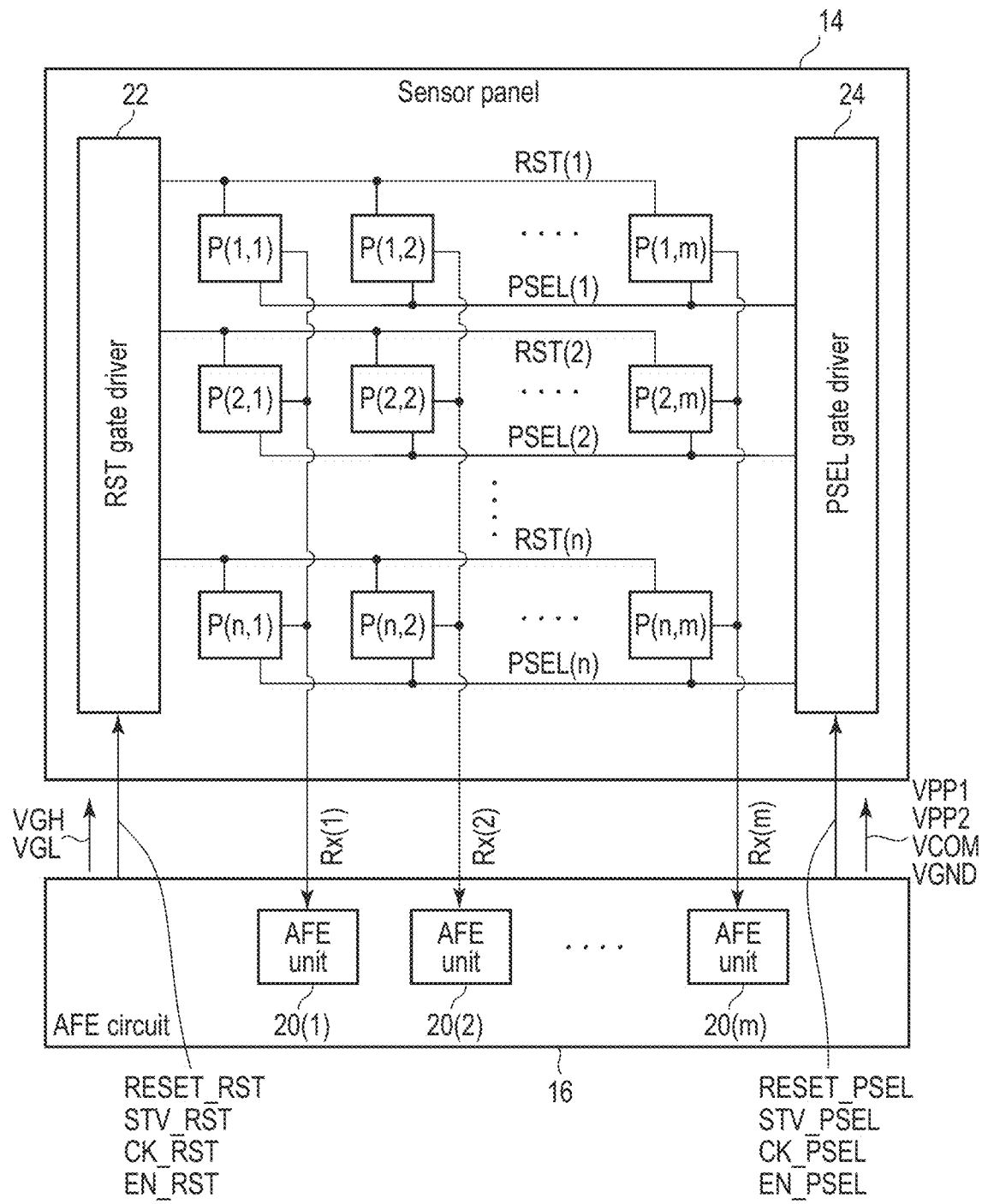
FIG. 2 is a diagram for explaining an example of a sensor panel and an AFE circuit according to the embodiment.

FIG. 2 is a diagram for explaining an example of the sensor panel 14 and the AFE circuit 16 according to the embodiment. The sensor panel 14 comprises n×m sensor units P(1, 1) to P(n, m), a reset (RST) gate driver 22 and a sensor unit selection (PSEL) gate driver 24. The sensor units P(1, 1) to P(n, m) are provided in a two-dimensional array in X and Y directions. Each of n and m is an arbitrary positive integer.

Sensor units P(1, 1) to P(1, m) are provided in the first row from the upper side of the two-dimensional array. Sensor units P(2, 1) to P(2, m) are provided in the second row from the upper side of the two-dimensional array. The remaining sensor units are provided in the same manner. Sensor units P(n, 1) to P(n, m) are provided in the n-th row from the upper side of the two-dimensional array, in other words, the lowest row of two-dimensional array.

Sensor units P(1, 1) to P(n, 1) are provided in the first column from the left of the two-dimensional array. Sensor units P(1, 2) to P(n, 2) are provided in the second column from the left of the two-dimensional array. The remaining sensor units are provided in the same manner. Sensor units P(1, m) to P(n, m) are provided in the m-th column from the left of the two-dimensional array, in other words, the rightmost row of two-dimensional array.

The RST gate driver 22 comprises n output terminals which output n rest pulses RST, respectively. Each of the n reset pulses RST is supplied to the sensor units P of a corresponding row. A reset pulse RST(1) is supplied to the sensor units P(1, 1) to P(1, m) of the first row. A reset pulse RST(2) is supplied to the sensor units P(2, 1) to P(2, m). In this way, reset pulses RST are configured to be supplied such that a reset pulse RST(n) is supplied to the sensor units P(n, 1) to P(n, m).

The PSEL gate driver 24 comprises n output terminals which output n select signals PSEL, respectively. Each of the n select signals PSEL is supplied to the sensor units P of a corresponding row. A select signal PSEL(1) is supplied to the sensor units P(1, 1) to P(1, m). A select signal PSEL(2) is supplied to the sensor units P(2, 1) to P(2, m). In this way, select signals PSEL are configured to be supplied such that a select signal PSEL(n) is supplied to the sensor units P(n, 1) to P(n, m).

The AFE circuit 16 comprises m AFE units 20(1) to 20(*m*). The AFE units 20(1) to 20(*m*) respectively process the signals from the sensor units P of the respective columns.

A sensor signal Rx(1) of each of the sensor units P(1, 1) to P(n, 1) of the first column from the left of two-dimensional array is supplied to the AFE unit 20(1). From the sensor units P(1, 1) to P(n, 1), sensor units P selected by the select signals PSEL in series output the sensor signals Rx in series. A sensor signal Rx(2) of each of the sensor units P(1, 2) to P(n, 2) of second column from the left of two-dimensional array is supplied to the AFE unit 20(2). In this way, sensor signals Rx are configured to be supplied such that a sensor signal Rx(m) of each of the sensor units P(1, m) to P(n, m) of m-th column from the left of two-dimensional array, in other words, the rightmost column of two-dimensional array, is supplied to the AFE unit 20(*m*).

Other than the AFE units 20(1) to 20(*m*), the AFE circuit 16 comprises a signal supply unit which supplies power source voltages and control signals to the sensor units P. The AFE circuit 16 supplies two power source voltages VGH and VGL to the RST gate driver 22 and the PSEL gate driver 24. The AFE circuit 16 supplies four power source voltages VPP1, VPP2, VCOM, and VGND to the sensor units P. The AFE circuit 16 supplies four control signals RESET_RST, STV_RST, CK_RST, and EN_RST to the RST gate driver 22. The AFE circuit 16 supplies four control signals RESET_PSEL, STV_PSEL, CK_PSEL, and EN_PSEL to the PSEL gate driver 24. The signals RESET_PSEL and RESET_RST are frame reset signals for resetting the sensor device 10 once for each frame. The signals STV_PSEL and STV_RST are frame start signals and are output once for each frame. One frame is a period for outputting the sense signals of all sensor units P. The signals CK_PSEL and CK_RST are clock signals for selecting a row of two-dimensional array. The signal EN_PSEL is a signal for selecting or non-selecting the sensor units P in the row of two-dimensional array. The signal EN_RST is a signal for resetting an inner circuit of the sensor units P in the row of two-dimensional array. The sensor unit P outputs a sensor signal during light exposure.

FIG. 3 is a diagram for explaining an example of the sensor units P and the AFE units 20 to explain the basic operation of the sensor device 10 according to the embodiment. The sensor units P comprise the same configuration. The AFE units 20 comprise the same configuration. By way of example, FIG. 3 shows the sensor units P(i, j) and P(i+1, j), and the AFE unit 20(*j*), where i is an arbitrary positive integer from 1 to n, and j is an arbitrary positive integer from 1 to m.

Each sensor unit P is a voltage detection type of optical sensor with 3-transistor and 1-diode. Each transistor may be a bipolar transistor or a metal oxide semiconductor field effect transistor (MOSFET). In the example of FIG. 3, MOSFETs are used. Each sensor unit P comprises MOSFETs 32, 34 and 36, and a photodiode 40.

The power source voltage VCOM is applied to the drain of MOSFET 32. The reset pulse RST(i) is supplied to the gates of MOSFETs 32 of sensor units P(i, 1) to P(i, m) of i-th row. The reset pulse RST(i+1) is supplied to the gates of MOSFETs 32 of sensor units P(i+1, 1) to P(i+1, m) of (i+1)th row. The source of MOSFET 32 is connected to the gate of MOSFET 34. The reset pulses RST(i) and RST(i+1) correspond to the signal RN_RST of FIG. 2.

The source of MOSFET 32 (in other words, the gate of MOSFET 34) is connected to the cathode of photodiode 40. The cathode of photodiode 40 is called a node n1. The power source voltage VPP2 is applied to the anode of photodiode 40. A capacitor 42 is connected to the photodiode 40 in parallel. The capacitor 42 is charged by the photocurrent generated by the photodiode 40.

The power source voltage VPP1 is applied to the drain of MOSFET 34. The source of MOSFET 34 is connected to the drain of MOSFET 36. The select signal PSEL(i) is supplied to the gates of MOSFETs 36 of sensor units P(i, 1) to P(i, m) of i-th row. The select signal PSEL(i+1) is supplied to the gates of MOSFETs 36 of sensor units P(i+1, 1) to P(i+1, m) of (i+1)th row. The sources of MOSFETs 36 of sensor units P(1, j) to P(n, j) of j-th column are the output terminals of sensor units P for outputting the sensor signal Rx(j).

The sensor unit P(i, j) of j-th column of i-th row selected by the select signal PSEL(i) outputs the sensor signal Rx(j). The sensor signal Rx(j) is supplied to the input terminal of AFE unit 20(*j*) via a resistor 38. The resistor 38 is a resistor of a wiring for transmitting the sensor signal Rx(j) from the sensor unit P(i, j) to the AFE unit 20(*j*).

The MOSFET 34 is a source follower circuit. The drain-source current Ib of MOSFET 34 is expressed by equation 1.

$$Ib = (½) \times \alpha (Vgs - Vth)^2 \qquad \text{Equation 1}$$

$$\alpha = \mu \times Cox \times (W/L) \qquad \text{Equation 2}$$

In the above equations, Vgs is the gate-source voltage of MOSFET 34, Vth is the threshold voltage of MOSFET 34, p is the electron mobility of MOSFET 34, Cox is the gate oxidized film capacity of MOSFET 34 per unit area, and W/L is a coefficient unique to the MOSFET 34.

Each AFE unit 20 comprises a current source 52, a buffer amplifier 54, and an A/D converter (ADC) 56. The current source 52 is connected to the input terminal of AFE unit 20.

The current source 52 is the current source of the drain-source current Ib of MOSFET 34.

An input voltage Vi of AFE unit 20 is input to the buffer amplifier 54. An output voltage Vo of the buffer amplifier 54 is input to the data processing circuit 18 via the A/D converter 56.

The MOSFETs 36 of sensor units P(i, 1) to P(i, m) of i-th row are conductive or nonconductive based on the level of select signal PSEL(i). While the MOSFET 36 is conductive, the buffer amplifier 54 outputs the voltage Vo (=Vi) expressed by equation 3.

$$Vo(=Vi)=(Vn1-\Delta Vn1)-Vth-((2/a)Ib)^{1/2}-IbR \qquad \text{Equation 3}$$

In the above equation, Vn1 is the voltage of node n1, $\Delta$Vn1 is a voltage drop of the node n1 by a photocurrent flowing through the photodiode 40, R is the resistance of resistor 38, and Id is the photocurrent.

The MOSFETs 32 of sensor units P(i, 1) to P(i, m) of i-th row are conductive or nonconductive based on the level of reset pulse RST(i). While the MOSFET 32 is conductive, the buffer amplifier 54 outputs the voltage Vo (=Vi) expressed by equation 4.

$$Vo(=Vi)=Vn1-Vth-((2/a)Ib)^{1/2}-IbR \qquad \text{Equation 4}$$

The buffer amplifier 54 outputs a difference $\Delta$Vo between Vo (=Vi) of the period in which the MOSFET 36 is conductive and Vi (=Vo) of the period in which the MOSFET 32 is conductive. $\Delta$Vo is the voltage of sense signal output from the sensor unit P(i, j). $\Delta$Vo is expressed by equation 5.

$$\Delta Vo = \Delta Vni \qquad \text{Equation 5}$$

The voltage $\Delta$Vo is a difference between a first voltage of the node n1 and a second voltage of the node n1. The first voltage is a voltage after the photocurrent Id is flowed through the photodiode 40 while the MOSFET 36 is conductive and light is incident on the photodiode 40. The second voltage is a voltage when the MOSFET 32 is turned on while the MOSFET 36 is conductive.

Figure 4:
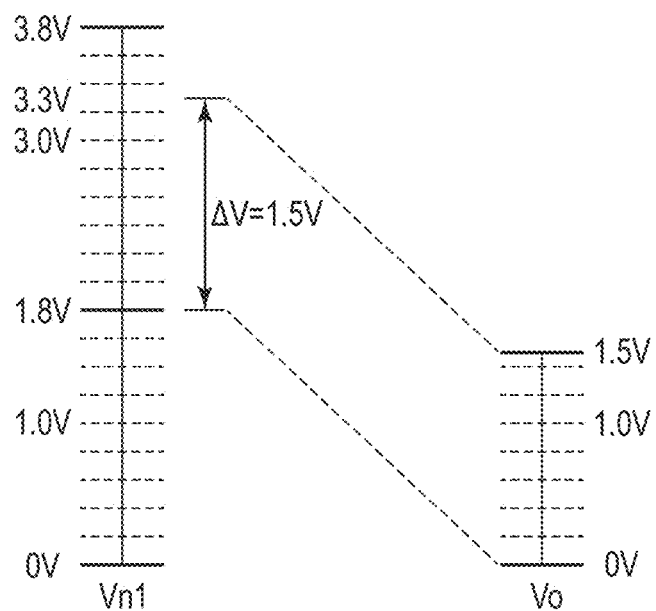
FIG. 4 is a diagram for explaining the relationship between voltages Vn1 and Vo according to the embodiment.

FIG. 4 is a diagram for explaining the relationship between the voltage Vn1 of node n1 of sensor unit P(i, j) and the analog output voltage Vo of buffer amplifier 54 according to the embodiment.

It is assumed that the resolution of A/D converter 56 is 1.5 V. The analog output voltage Vo of buffer amplifier 54 changes in the range of 0 V to 1.5 V. It is assumed that the power source voltage VPP1 is 3.8 V. In consideration of the voltage drop of photodiode 40 by the photocurrent, the voltage Vn1 of node n1 changes in the range of 1.8 V to 3.3 V.

Figure 5:
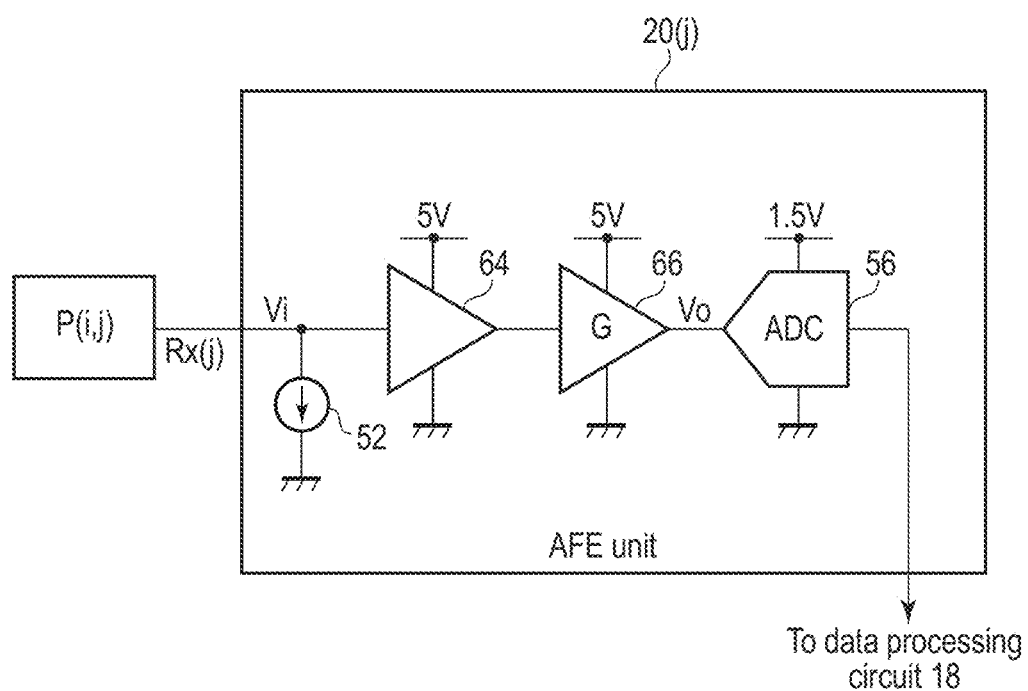
FIG. 5 is a diagram for explaining an effect caused to a sensor signal by a change in threshold voltage Vth of MOSFET according to the embodiment.

FIG. 5 is a diagram for explaining the effect caused to a sensor signal by the change in threshold voltage Vth of MOSFET 36 of each sensor unit P according to the embodiment. The input voltage Vi of AFE unit 20(j) (in other words, the output voltage Rx(i) of sensor unit P(i, j)) is input to a buffer amplifier 64. The buffer amplifier 64 is driven by 5 V power. The buffer amplifier 64 expands a voltage range of the sensor panel 14. The buffer amplifier 64 may be a differential amplifier. The output voltage Rx(i) of sensor unit P(i, j) is input to a negative input terminal of differential amplifier 64. A reference voltage Vref (for example, 0.75 V) is input to a positive input terminal of the differential amplifier 64. The output signal of buffer amplifier 64 is input to the A/D converter 56 via a gain adjustment amplifier 66. The gain adjustment amplifier 66 is driven by 5 V power. The buffer amplifier 64 and the gain adjustment amplifier 66 correspond to the buffer amplifier 54 of FIG. 3. The gain adjustment amplifier 66 lowers the output voltage so that the output voltage is within the voltage range (=1.5 V) of A/D converter 56.

The voltage Vi changes based on the voltage $\Delta$Vo. The voltage Vi also changes based on the change in the threshold voltage Vth of MOSFET 36. Even if the voltage Vi changes, it is necessary to set the input tolerance of AFE unit 20(j) to 5 V such that the voltage $\Delta$Vo of a sense signal can be detected. When the buffer amplifier 64 and the gain adjustment amplifier 66 operate at 3.3 V, the input tolerance may be 3.3 V.

While the MOSFET 36 is conductive, the output voltage Vo of buffer amplifier 54 (or the input voltage Vi of AFE unit 20(j)) is expressed by equation 6.

$$Vo(=Vi)=(Vn1-\Delta Vn1)-(Vth+\Delta Vth)-((2/a)Ib)^{1/2}-IbR \qquad \text{Equation 6}$$

In the above equation, $\Delta$Vth is a change in the threshold voltage Vth of MOSFET 34, and is, for example, $\pm 0.5$ V.

While the MOSFET 32 is conductive, the output voltage Vo of buffer amplifier 54 (or the input voltage Vi of AFE unit 20(j)) is expressed by equation 7.

$$Vo(=Vi)=Vn1-(Vth+\Delta Vth)-((2/a)Ib)^{1/2}-IbR \qquad \text{Equation 7}$$

The difference (the sense signal $\Delta$Vo) between Vo (=Vi) of the period in which the MOSFET 36 is conductive and Vo (=Vi) of the period in which the MOSFET 32 is conductive is expressed by equation 8.

$$\Delta Vo = \Delta Vn1 \qquad \text{Equation 8}$$

Figure 6:
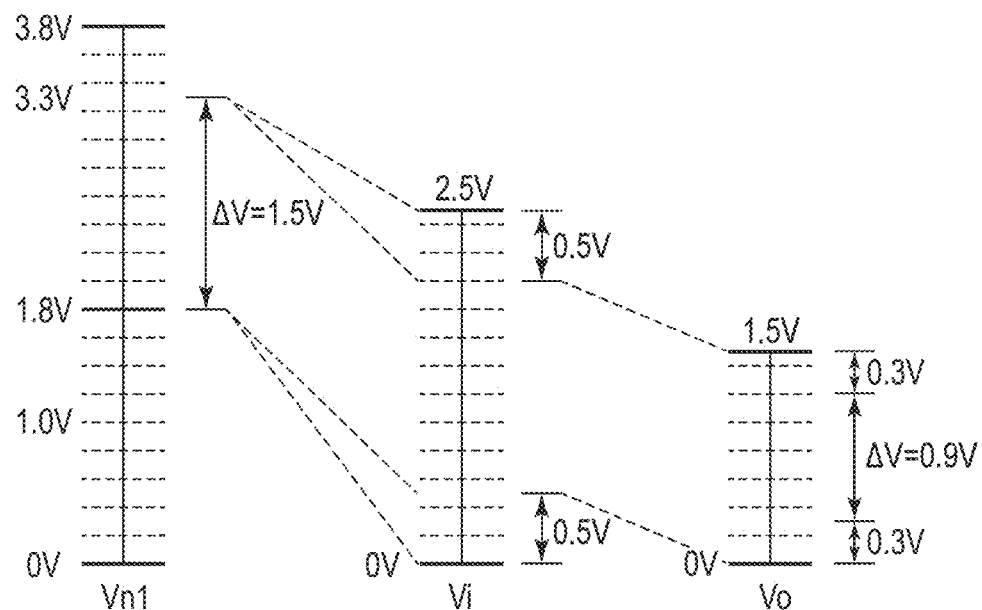
FIG. 6 is a diagram for explaining a relationship of voltage Vn1, input voltage Vi, and output voltage Vo according to the embodiment.

FIG. 6 is a diagram for explaining the relationship of the voltage Vn1 of node n1 of sensor unit P(i, j), the input voltage Vi of buffer amplifier 64, and the analog output voltage Vo of amplifier 66 according to the embodiment.

It is assumed that the resolution of A/D converter 56 is 1.5 V. In a manner similar to that of FIG. 4, the change range $\Delta$V of the voltage Vn1 of node n1 is 1.8 V to 3.3 V.

In consideration of the change of $\pm 0.5$ V of threshold voltage Vth of MOSFET 34, the input voltage Vi of AFE unit 20(j) changes in the range of 0.5 V to 2.0 V.

Since the input voltage Vi of AFE unit 20(j) is converted into a digital signal by the A/D converter 56 having a resolution of 1.5 V, the change range $\Delta$V of the sense signal is 0.9 V (=0.3 V to 1.2 V). Where, 0.3 V=0.5 V$\times$1.5 V/2.5 V.

Figure 7:
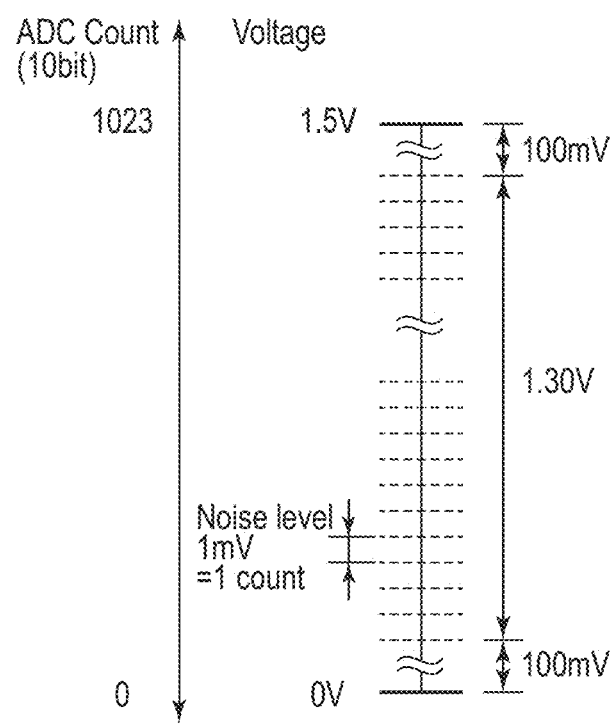
FIG. 7 is a diagram for explaining a dynamic range of an A/D converter according to the embodiment.

FIG. 7 is a diagram for explaining the dynamic range of the A/D converter 56 according to the embodiment. The A/D converter 56 converts an input voltage of 1.5 V into a digital signal of 10 bits (count value 0 to count value 1023). However, a first range in which the input voltage is 0 V to 0.1 V (100 mV) and a second range in which the input voltage is 1.4 V to 1.5 V indicate that the performance of the A/D converter 56 is unsatisfactory. Thus, the A/D converter 56 outputs an input voltage of 1.5 V as count value 0 to count value 921 (maximum detection value Max). A voltage less than 1 mV is regarded as a noise level and is not detected. The minimum detection value Min is count value 1.

The dynamic range DR (dB) of A/D converter 56 is expressed by equation 9.

$$\begin{aligned}DR &\qquad \text{Equation 9}\\ &= 20\log(\text{Max}/\text{Min})\\ &= 20\log(887/1)\\ &= 59 \text{ (dB)}\end{aligned}$$

Thus, when the threshold voltage Vth of MOSFET 34 varies, the dynamic range of A/D converter 56 is narrow compared to a case where the threshold voltage Vth does not vary.

FIG. 8 is a diagram for explaining an example of a configuration for enlarging the dynamic range DR of A/D converter 56 in the sensor device according to the embodiment. The sensor unit P(i, j) comprises an OR gate 102 and a level shifter (LS) 104 in addition to the configuration shown in FIG. 3. The reset pulse RST(i) supplied to the sensor units P of i-th row is input to the OR gate 102.

The j-th AFE unit 20(j) supplies the reset control pulse RST_CTRL(j) to the sensor units P(1, j) to P(n, j) of j-th column. The level shifter 104 adjusts the level of reset control pulse RST_CTRL(j). The reset control pulse RST_CTRL_LS(j) which is output from the level shifter 104 after the level adjustment is input to the OR gate 102. The reset pulse RST2(i) output from the OR gate 102 is supplied to the gate of MOSFET 32.

The AFE unit 20 comprises a comparator 106, an inverter 108, and a switch 110 in addition to the configuration shown in FIG. 3. A first terminal of the switch 110 is connected to the input terminal of AFE unit 20. A second terminal of the switch 110 is connected to the connection point between the buffer amplifier 54 and the current source 52. The PSEL gate driver 24 supplies the select signals PSEL(1) to PSEL(n) to a control terminal of the switch 110. The switch 110 is conductive when the select signal PSEL is at a high level. When the switch 110 is conductive, the drain-source current Ib of MOSFET 34 is supplied to the current source 52. The voltage Vi is input to the AFE unit 20.

The comparator 106 compares the output voltage Vo of buffer amplifier 54 with the reference voltage Vref. The comparator 106 outputs a negative pulse when the output voltage Vo of buffer amplifier 54 is less than or equal to the reference voltage Vref. The output pulse of comparator 106 of j-th AFE unit 20(j) is supplied to the OR gates 102 via the level shifters 104 of sensor units P(1, j) to P(n, j) of j-th column as the reset control pulse RST_CTRL(j) via the inverter 108.

The data processing circuit 18 comprises a data processor 70 provided for each column of the sensor units of two-dimensional array. Each data processor 70 comprises a counter 112 and an arithmetic operation module 114. The output pulse of the comparator 106 is supplied to the counter 112. The count value of the counter 112 is supplied to the arithmetic operation module 114. The output signal of A/D converter 56 of AFE unit 20(j) is supplied to the arithmetic operation module 114 of data processor 70(j).

Figure 9:
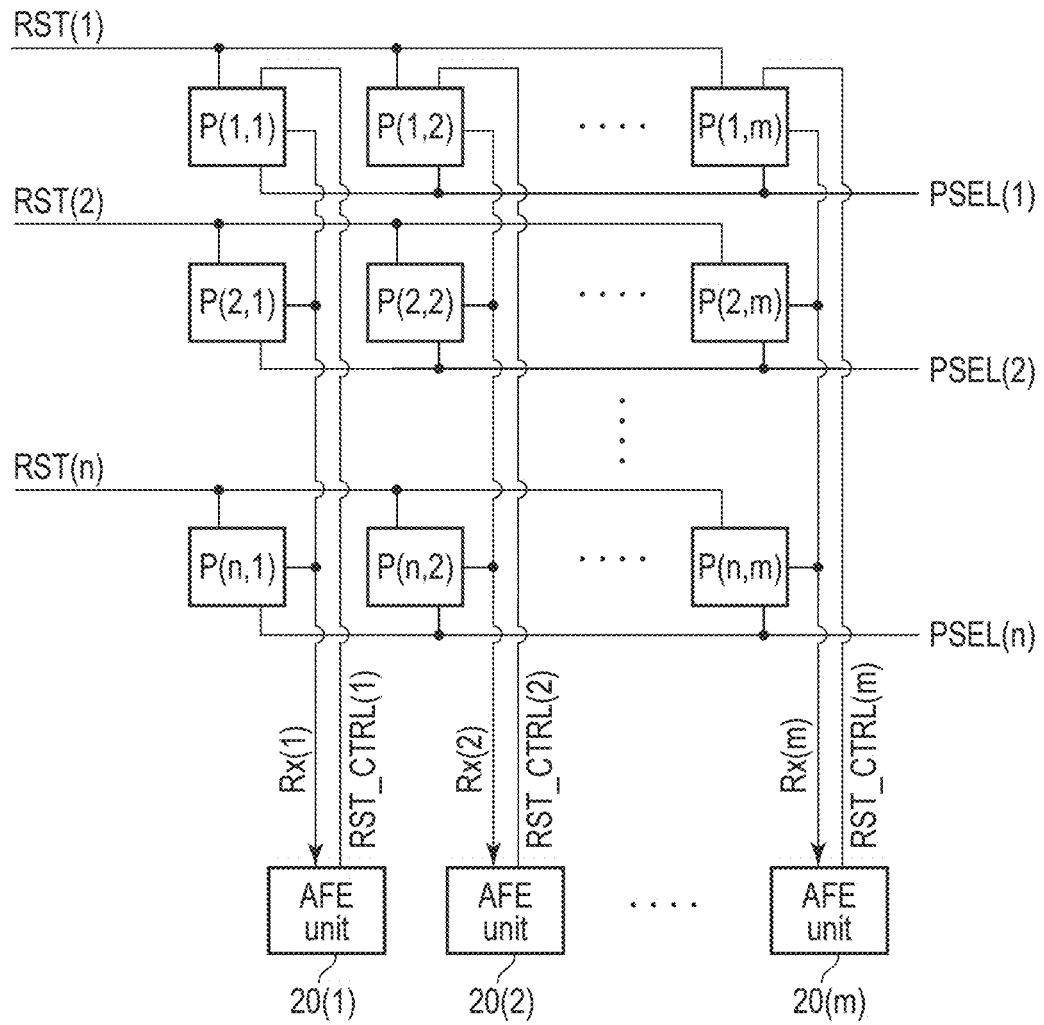
FIG. 9 is a diagram for explaining the relationship between sensor units and AFE units according to the embodiment.

FIG. 9 is a diagram for explaining the relationship between the sensor units P and the AFE units 20 according to the embodiment. The sensor units P(1, 1) to P(n, 1) of the first column are connected to the AFE unit 20(1). The sensor signal Rx(1) of sensor units P(1, 1) to P(n, 1) of the first column is supplied to the AFE unit 20(1). The AFE unit 20(1) supplies the reset control pulse RST_CTRL(j) to the sensor units P(1, 1) to P(n, 1) of the first column.

The sensor units P(1, 2) to P(n, 2) of the second column are connected to the AFE unit 20(2). The sensor signal Rx(2) of sensor units P(1, 2) to P(n, 2) of the second column is supplied to the AFE unit 20(2). The AFE Unit 20(2) supplies the reset control pulse RST_CTRL(2) to the sensor units P(1, 2) to P(n, 2) of the second column.

In this manner, similarly, the sensor units P(1, m) to P(n, m) of the m-th column are connected to the AFE unit 20(m). The sensor signal Rx(m) of sensor units P(1, m) to P(n, m) of the m-th column is supplied to AFE unit 20(m). The AFE Unit 20(m) supplies the reset control pulse RST_CTRL(m) to the sensor units P(1, m) to P(n, m) of the m-th column.

Figure 10:
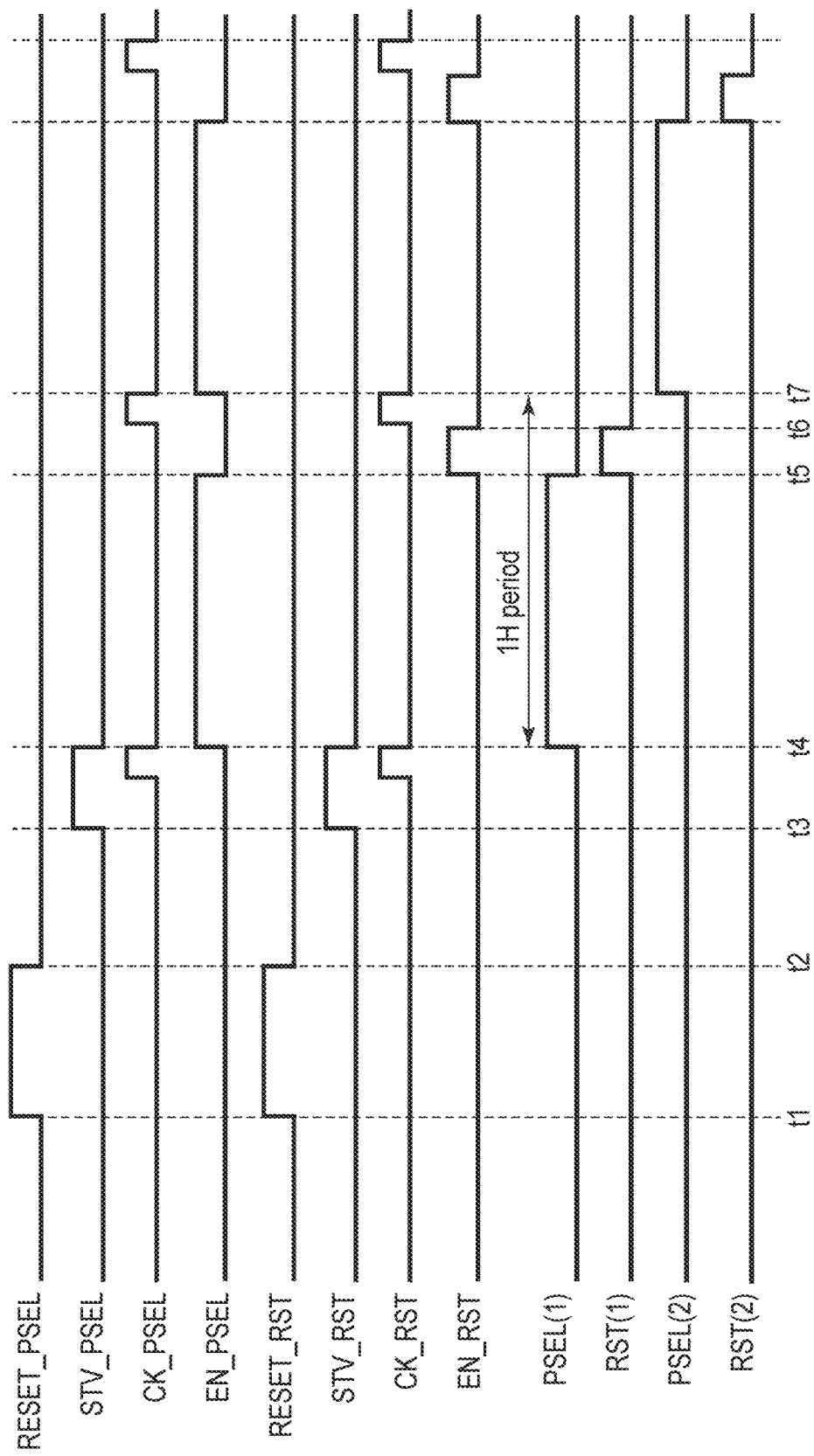
FIG. 10 is a signal waveform chart for explaining an example of the operation of the sensor device 10 according to the embodiment.

FIG. 10 is a signal waveform chart for explaining an example of the operation of the sensor device 10 according to the embodiment.

The AFE circuit 16 outputs the frame reset signals RESET_PSEL and RESET_RST for a certain period (times t1 to t2). The AFE circuit 16 supplies the signal RESET_P-SEL to the PSEL gate driver 24 and supplies the signal RESET_RST to the RST gate driver 22. The RST gate driver 22 is reset by the frame reset signals RESET_RST. The PSEL gate driver 24 is reset by the frame reset signals RESET_RPSEL.

The AFE circuit 16 outputs the frame start signals STV_PSEL and STV_RST for a certain period (times t3 to t4). The AFE circuit 16 supplies the signals STV_PSEL to the PSEL gate driver 24 and supplies the signal STV_RST to the RST gate driver 22.

The AFE circuit 16 outputs the clock signals CK_PSEL and CK_RST after time t3. The falling edges of clock signals CK_PSEL and CK_RST are synchronized with the falling edges of frame start signals STV_PSEL and STV_RST (time t4). The AFE circuit 16 supplies the signal CK_PSEL to the PSEL gate driver 24 and supplies the signal CK_RST to the RST gate driver 22. When the PSEL gate driver 24 and the RST gate driver 22 receive the clock signals CK_PSEL and CK_RST, the PSEL gate driver 24 and the RST gate driver 22 select the sensor units P(1, 1) to P(1, m) of the first row from the sensor units P of the two-dimensional array.

The AFE circuit 16 supplies the enable signal EN_PSEL to the PSEL gate driver 24 for a certain period (times t4 to t5). The PSEL gate driver 24 outputs the select signal PSEL(1) in synchronization with the enable signal EN_P-SEL. The select signal PSEL(1) is supplied to the sensor units P(1, 1) to P(1, m) of the first row of the two-dimensional array. By this operation, the MOSFETs 36 of the sensor units P(1, 1) to P(1, m) of the first row of the two-dimensional array are turned on. The drain-source current Ib of each MOSFET 34 is supplied to the current source 52. The voltage ΔVo of node n1 is output from the sensor units P(1, 1) to P(1, m) and is supplied to the AFE units 20(1) to 20(m) as the voltage Vi. The output period (times t4 to t5) of the select signal PSEL(1) is the period of light exposure of the photodiodes 40 of sensor units P(1, 1) to P(1, m) of the first row.

The AFE circuit 16 causes the A/D converter 56 to output a digital value based on the sensor signal at time t5. The AFE circuit 16 supplies the enable signal EN_RST to the RST gate driver 22 for a certain period (times t5 to t6).

The RST gate driver 22 outputs the reset pulse RST(1) in synchronization with the enable signal EN_RST (times t5 to t6). The reset pulse RST(1) is supplied to the sensor units P(1, 1) to P(1, m) of the first row of the two-dimensional array. By this operation, the MOSFETs 32 of sensor units P(1, 1) to P(1, m) of the first row of the two-dimensional array are turned on. The voltage of node n1 is reset to the voltage VCOM.

After time t6, in order to select the next row (second row) of the sensor unit P(i, j) of the two-dimensional array, the AFE circuit 16 outputs the clock signals CK_PSEL and CK_RST. The falling edges of the clock signals CK_PSEL and CK_RST are synchronized with the rising edges of the enable signal EN_PSEL (time t7). The cycles of clock signal CK_PSEL and clock signal CK_RST are equal to each other and are referred to as a 1H period.

Figure 11:
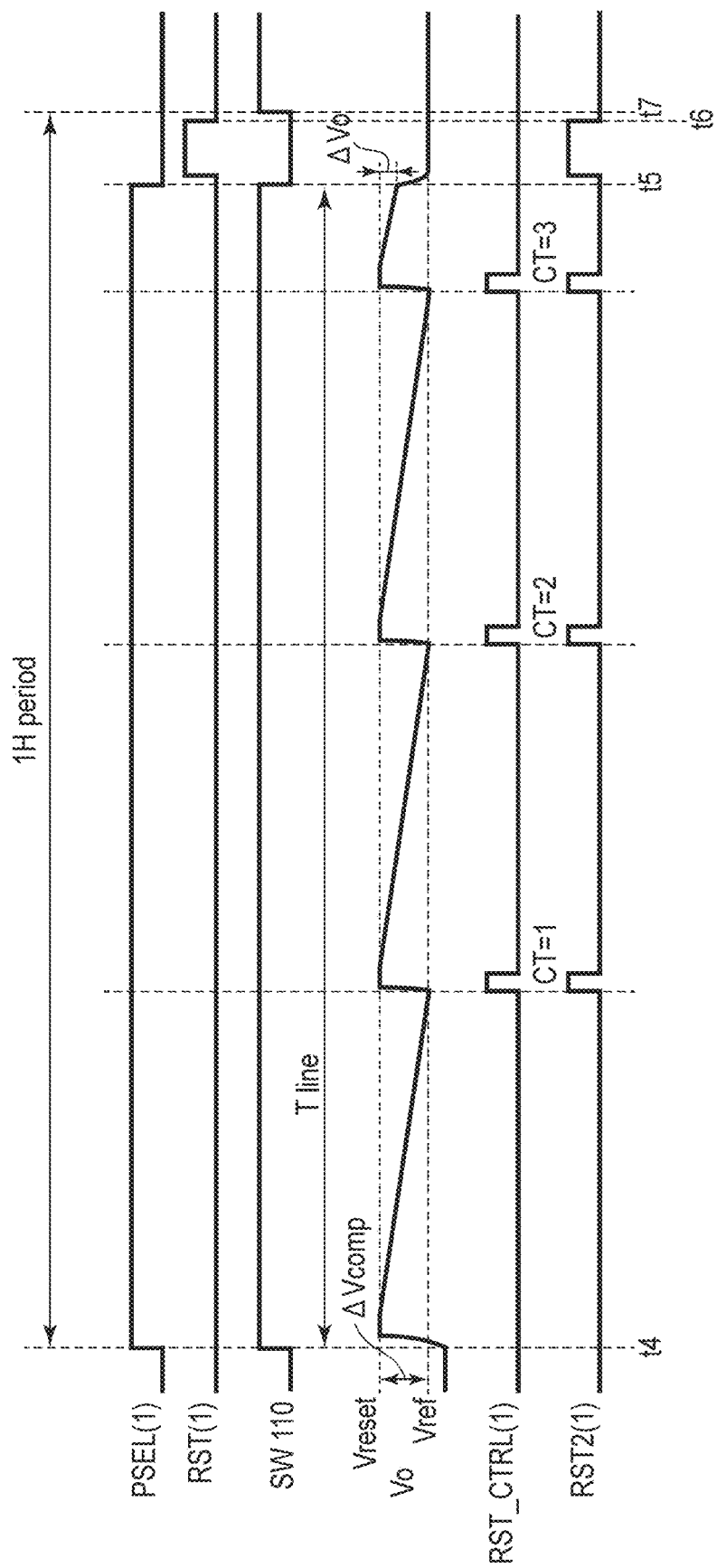
FIG. 11 is a detailed signal waveform chart of 1H period of FIG. 10.

FIG. 11 is a detailed signal waveform chart of the 1H period of FIG. 10.

FIG. 11 shows the select signal PSEL(1), reset pulse RST(1), on/off state of the switch 110, voltage Vo, reset control pulse RST_CTRL(1), and reset pulse RST2(1). When the select signal PSEL(1) is at a high level, the SW 110 is conductive (in an on state). When the level of the select signal PSEL(1) is changed to a high level (time t4), the SW 110 becomes conductive, and the voltage Vo is set to the reset voltage Vreset.

When light is made incident, the photocurrent of the photodiode 40 is increased, and the voltage Vn1 of node n1 is decreased. The decrease ΔVn1 of voltage Vn1 is expressed by equation 10.

$$\Delta Vn1 = -(Id \times Tline/Cs) \qquad \text{Equation 10}$$

In the above equation, Tline is a period in which the select signal PSEL(1) is at a high level and a period of light exposure, and Cs is the capacity of the capacitor 42.

The output voltage Vo of buffer amplifier 54 decreases over time from time t4. When the output voltage Vo of buffer amplifier 54 is less than or equal to the reference voltage Vref of comparator 106, the comparator 106 supplies the reset control pulse RST_CTRL(j) to the OR gate 102 via the inverter 108. Thus, the voltage Vn1 of the node n1 is reset to the reset voltage VCOM, and the voltage Vo is reset to the reset voltage Vreset. The counter 112 counts the reset control pulse RST_CTRL(j) and stores a count value CT.

In this manner, the voltage Vo repeats a decrease and a reset to the reset voltage Vreset. When the select signal PSEL(1) turns to a low level at time t5, the switch 110 is nonconductive. The arithmetic operation unit 114 calculates the sum ΔVout_total of the sensor signals output from the sensor unit P(i, j) during the period Tline of light exposure based on the output ΔVo of A/D converter 56 and the count value CT stored in the counter 112 as shown in equation 11.

$$\begin{aligned}\Delta Vout\_total \qquad &\text{Equation 11}\\ = \Delta Vn1\\ = -(Id \times Tline/Cs)\\ = CT \times \Delta Vcomp + \Delta Vo\end{aligned}$$

In the above equation, ΔVcomp is the difference between Vreset and Vref.

For example, when the photocurrent Id is 0.5 μA, and the period Tline of light exposure is 50 ms, and Cs is 10 pF, ΔVn1 is expressed by equation 12.

$$\begin{aligned}\Delta Vn1 \qquad &\text{Equation 12}\\ = -(Id \times Tline/Cs)\\ = -2500 \text{ mV}\end{aligned}$$

In the embodiment, by resetting the voltage of node n1, the dynamic range can be enlarged. For example, when ΔVcomp is equal to 800 mV, the number CT of times of reset is three (3×800=2400<2500). Vout_total is 2500 mV. Output ΔVo of the A/D converter 56 at time t5 is 2500 mV-2400 mV=100 mV.

The dynamic range DR is calculated by 20 log(Max/Min) as expressed by equation 9, where Min is 1. The A/D converter 56 expresses an input voltage of 1.5 V (1500 mV) by 10 bits; 1024 values. Therefore, Max is ΔVcomp(CT+1) (1024/1500). In the embodiment shown in FIG. 8, the dynamic range is expressed by equation 13.

$$\begin{aligned}DR \qquad &\text{Equation 13}\\ = 20\log(\text{Max/Min})\\ = 20\log(\Delta Vcomp((CT+1)/1500)1024/1)\\ = 20\log(800(4/1500)1024/1)\\ = 68 \text{ (dB)}\end{aligned}$$

In the embodiment shown in FIG. 8, the dynamic range is enlarged compared to the sensor device shown in FIG. 5 expressed by equation 9.

Figures 12, 13:
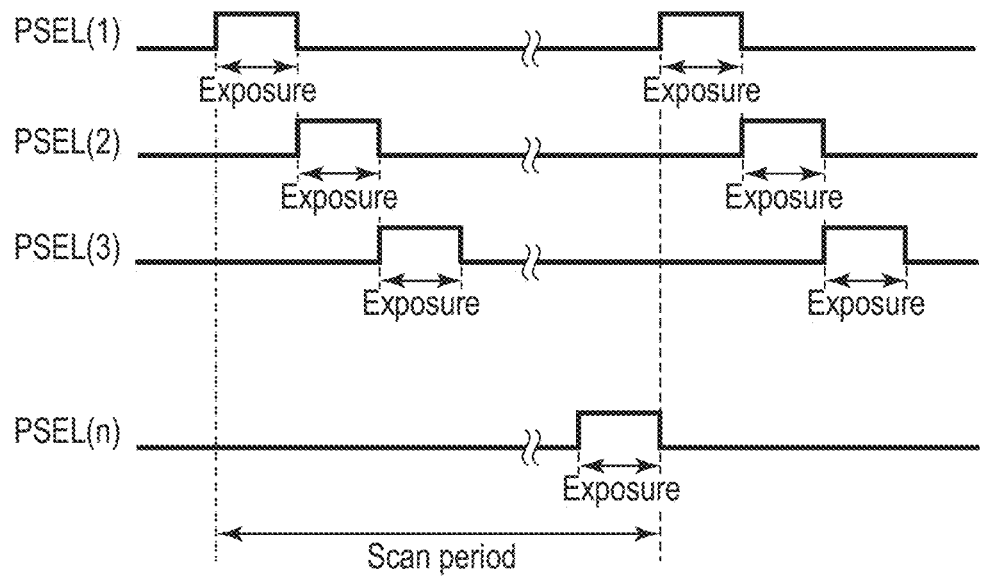
FIG. 12 is a signal waveform chart for explaining an example of the operation of the sensor elements according to the embodiment.
FIG. 13 is a chart showing the relationship of photocurrent Id, period Tline, capacity Cs, ΔVn1, the number m of times of reset, ΔVcomp, ΔVout-total, and the dynamic range according to the embodiment.

FIG. 12 is a signal waveform chart for explaining the operation of the sensor elements P in a two-dimensional array according to the embodiment. The period of light exposure is the Tline period of FIG. 11. For a first period of light exposure, the sensor elements P(1, 1) to P(1, m) of the first row supply the sensor signals Rx(1) to Rx(m) to the AFE units 20(1) to 20(m), respectively. In this manner, for the i-th period of light exposure, the sensor elements P(i, 1) to P(i, m) of i-th row supply the sensor signals Rx(1) to Rx(m) to the AFE units 20(1) to 20(m), respectively. When the sensor signals of all of n rows are supplied to the AFE units 20(1) to 20(m), a single sensing period (scanning period) is terminated.

FIG. 13 is a chart showing the relationships of the photocurrent Id, the period Tline of light exposure, the capacity Cs of capacitor 42, ΔVn1, the number m of times of reset, ΔVcomp, ΔVout-total, and the dynamic range (dB) according to the embodiment. When the intensity of incident light does not change, and the photocurrent Id is constant as 0.5 nA, the number CT of times of reset can be increased by lengthening the time Tline of light exposure. By the increase in the number CT of times of reset, the dynamic range is enlarged.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor device comprising:
a sensor configured to output a sense signal, a value of the sense signal changing over time based on incident light;
a first reset circuit configured to set the value of the sense signal to a reset value when the value of the sense signal exceeds a threshold;
a counter configured to count a first number of times of reset by the first reset circuit; and
an arithmetic operation circuit configured to calculate an amount of incident light of a certain period based on the value of the sense signal, the reset value, and the first number of times of reset,
wherein
the sensor comprises a photodiode configured to generate current based on the incident light and including a terminal connected to an output terminal of the sensor, a capacitor charged with the current, a first transistor configured to set the voltage of the terminal of the photodiode to a reset voltage based on the reset value, a second transistor configured to supply a constant current based on a charged voltage of the capacitor, and a third transistor configured to be conductive for the certain period and output the constant current from the sensor, the first reset circuit comprises a comparator configured to generate a first reset signal when the value of the sense signal is less than or equal to the threshold, the sensor device further comprises a second reset circuit configured to generate a second reset signal when the certain period is terminated, and a circuit element configured to supply the first reset signal or the second reset signal to a control terminal of the first transistor, the sensor comprises a plurality of sensor units in a two-dimensional array of n rows×m columns, where n and m are arbitrary positive integers, the first reset circuit comprises m reset units, each of the m reset units is connected to the sensor units of each of the columns, the second reset circuit comprises n second reset terminals, and each of the n reset terminals is connected to the sensor units of each of the rows.

2. The sensor device of claim 1, wherein
the value of the sense signal decreases over time; and
when the value of the sense signal is less than or equal to a first threshold, the first reset circuit is configured to set the value of the sense signal to the reset value.

3. The sensor device of claim 1, wherein
the arithmetic operation circuit is configured to calculate the amount of incident light based on the value of the sense signal, the reset value, and the first number of times of reset when the certain period is terminated.

4. The sensor device of claim 1, wherein
the arithmetic operation circuit is configured to calculate the amount of incident light based on a sum of a difference between the value of the sense signal and the reset value and a product of the first number of times of reset and the reset value when the certain period is terminated.

5. The sensor device of claim 1, further comprising a converter configured to convert the value of the sense signal into a digital value, and wherein the arithmetic operation circuit is configured to calculate the amount of incident light based on an output of the converter, the reset value, and the first number of times of reset.

6. The sensor device of claim 1, wherein
the first transistor comprises a first metal oxide semiconductor field effect transistor (MOSFET) connected between a terminal of the reset voltage and the terminal of the photodiode;
the capacitor is connected to the photodiode in parallel;
the second transistor comprises a second MOSFET;
a gate of the second MOSFET is connected to the terminal of the photodiode; and
the third transistor comprises a third MOSFET connected between the second MOSFET and the output terminal.

7. A sensing method using a sensor configured to output a sense signal, a value of the sense signal changing over time based on incident light, wherein
the sensor comprises
a photodiode configured to generate current based on the incident light and including a terminal connected to an output terminal of the sensor, a capacitor charged with the current, a first transistor configured to set the voltage of the terminal of the photodiode to a reset voltage based on a reset value, a second transistor configured to supply a constant current based on a charged voltage of the capacitor, and a third transistor configured to be conductive for a certain period and output the constant current from the sensor, a plurality of sensor units in a two-dimensional array of n rows×m columns, where n and m are arbitrary positive integers, the method comprising:

generating, by a first reset circuit having m reset units, a first reset signal when the value of the sense signal is less than or equal to a threshold, each of the m reset units being connected to the sensor units of each of the columns;

generating, by a second reset circuit having n second reset terminals, a second reset signal when the certain period is terminated, each of the n reset terminals being connected to the sensor units of each of the rows;

supplying the first reset signal or the second reset signal to a control terminal of the first transistor;

setting the value of the sense signal to the reset value when the value of the sense signal exceeds the threshold or when the certain period is terminated;

storing a first number of times of reset; and calculating an amount of incident light of the certain period based on the value of the sense signal, the reset value, and the first number of times of reset.

\* \* \* \* \*